US008566249B2

(12) United States Patent
Johnson

(10) Patent No.: US 8,566,249 B2
(45) Date of Patent: Oct. 22, 2013

(54) METHODS AND SYSTEMS FOR AUTHENTICATION AND AUTHORIZATION

(75) Inventor: Richard C. Johnson, E. Setauket, NY (US)

(73) Assignee: Oracle International Corporation, Redwood Shores, CA (US)

( * ) Notice: Subject to any disclaimer, the term of this patent is extended or adjusted under 35 U.S.C. 154(b) by 119 days.

(21) Appl. No.: 10/727,409

(22) Filed: Dec. 4, 2003

(65) Prior Publication Data
US 2004/0111375 A1 Jun. 10, 2004

(51) Int. Cl.
*G06Q 20/00* (2012.01)
*H04L 29/06* (2006.01)

(52) U.S. Cl.
USPC ............. 705/64; 713/156; 713/158; 713/173; 713/176

(58) Field of Classification Search
USPC ................. 705/64, 75; 713/158, 173, 176
See application file for complete search history.

(56) References Cited

U.S. PATENT DOCUMENTS

| 5,214,702 | A | * | 5/1993 | Fischer ............................ 380/30 |
| 5,412,717 | A | * | 5/1995 | Fischer ........................... 713/156 |
| 5,712,914 | A | * | 1/1998 | Aucsmith et al. ................ 380/30 |
| 6,134,550 | A | | 10/2000 | Van Oorschot et al. |
| 6,301,658 | B1 | | 10/2001 | Koehler |
| 6,321,333 | B1 | | 11/2001 | Murray |
| 6,367,009 | B1 | | 4/2002 | Davis et al. |
| 6,505,193 | B1 | | 1/2003 | Musgrave et al. |
| 6,611,869 | B1 | | 8/2003 | Eschelbeck et al. |
| 6,701,303 | B1 | * | 3/2004 | Dunn et al. ..................... 705/75 |
| 6,754,829 | B1 | | 6/2004 | Butt et al. |
| 6,854,056 | B1 | | 2/2005 | Benantar et al. |
| 6,910,128 | B1 | * | 6/2005 | Skibbie et al. ................ 713/170 |
| 6,934,848 | B1 | | 8/2005 | King et al. |
| 6,976,164 | B1 | | 12/2005 | King et al. |
| 6,986,037 | B1 | | 1/2006 | Assmann |
| 7,210,167 | B2 | | 4/2007 | Brezak et al. |
| 2002/0029337 | A1 | * | 3/2002 | Sudia et al. .................... 713/176 |
| 2002/0078355 | A1 | * | 6/2002 | Samar ........................... 713/176 |
| 2002/0144110 | A1 | * | 10/2002 | Ramanathan ................. 713/156 |
| 2003/0154376 | A1 | * | 8/2003 | Hwangbo ...................... 713/173 |
| 2004/0139327 | A1 | * | 7/2004 | Brown et al. ................. 713/176 |
| 2005/0060584 | A1 | * | 3/2005 | Ginter et al. .................. 713/201 |
| 2005/0204129 | A1 | * | 9/2005 | Sudia et al. .................... 713/158 |
| 2006/0179008 | A1 | * | 8/2006 | Tallent et al. ................... 705/75 |
| 2007/0157021 | A1 | * | 7/2007 | Whitfield ...................... 713/156 |

OTHER PUBLICATIONS

Poe, Lanette et al. "DSML gives you the power to access your LDAP information as XML" JavaWorld (Nov. 2000).

(Continued)

*Primary Examiner* — Charles C Agwumezie
(74) *Attorney, Agent, or Firm* — Kilpatrick Townsend & Stockton LLP

(57) ABSTRACT

A computer-implemented method for ensuring non-repudiation of a payment request and/or other action may include a step of receiving, over a network, the payment request together with a digital certificate identifying a user having caused the payment request to be generated. The certificate may include certificate-identifying information, user-identifying information, authority information that defines and delimits the authority of the user to make the payment request. The certificate-identifying information and the user-identifying information included within the received certificate may be validated. The authority information included within the received certificate may then be validated. The payment request and/or other action is then only executed when the certificate-identifying information, the user-identifying information and the authority information within the received certificate are successfully validated.

15 Claims, 6 Drawing Sheets

(56) References Cited

OTHER PUBLICATIONS

Oracle, "Oracle9*i*R2 Database Security for E-Business" pp. 1-26 (Jan. 2002).
Gerck, Ed "Overview of Certification Systems: X.509, PKIX, CA, PGP & SKIP" The Bell (Jul. 2000).
Oracle "Oracle Identity Management" (Sep. 2003).
Oracle Net8 Naming: Moving to LDAP from Oracle Names and TNSNAMES.ORG (Oct. 2003).
Oracle "Oracle 8*i* Security: Nerw Features and Secure Solutions" pp. 1-10 (Nov. 1999).
Yost, Guy "e-Business in the Enterprise Leveraging Metadirectories for e-Business" Technical Support (May 2000).
International Search Report mailed Oct. 14, 2003, in corresponding International Application No. PCT/US03/02111, filed Jan. 22, 2003 (4pgs).
International Preliminary Examination Report mailed Apr. 4, 2005, in corresponding International Application No. PCT/US03/02111, filed Jan. 22, 2003 (4pgs).
Office Action mailed Jan. 24, 2005, in parent U.S. Appl. No. 10/071,363, filed Feb. 7, 2002.
Final Office Action mailed Jul. 12, 2005, in parent U.S. Appl. No. 10/071,363, filed Feb. 7, 2002.

* cited by examiner

FIG. 4A
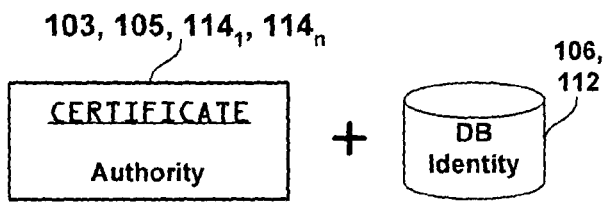
FIG. 4B
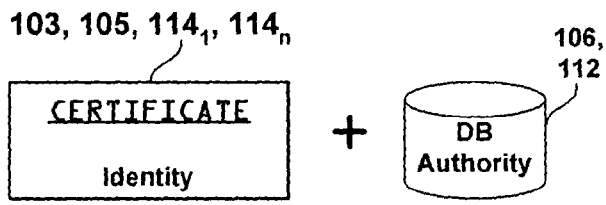
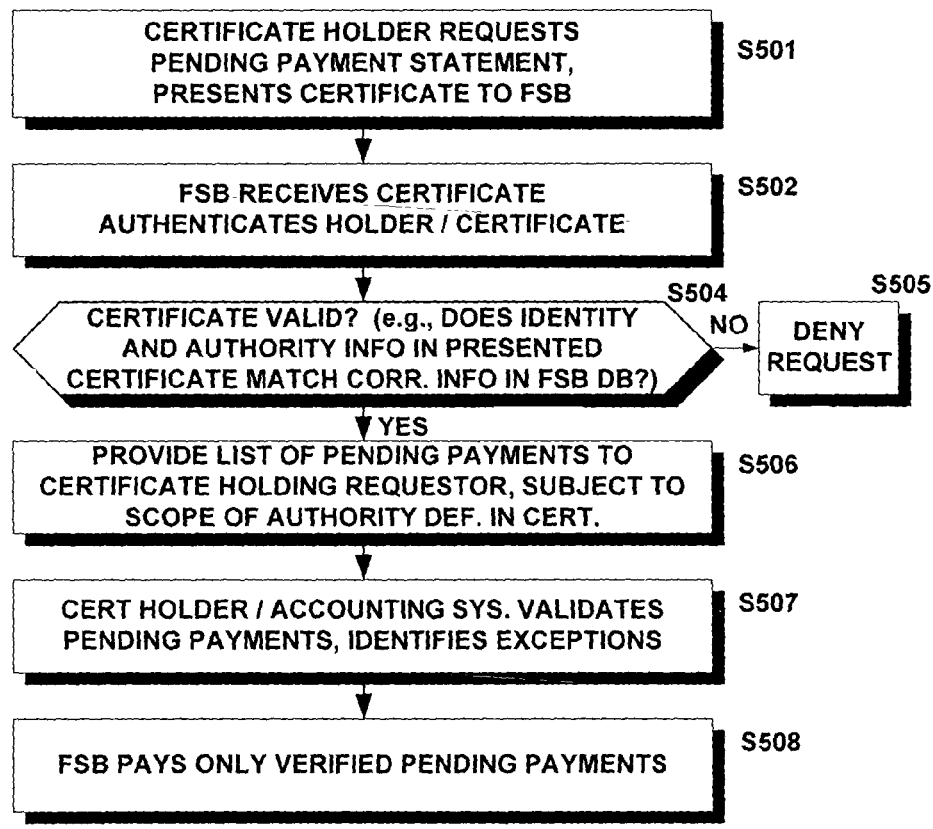
FIG. 5

METHODS AND SYSTEMS FOR AUTHENTICATION AND AUTHORIZATION

CROSS-REFERENCE TO RELATED APPLICATIONS

The present application is related in subject matter to co-pending and commonly assigned application Ser. No. 10/071,363, filed Feb. 7, 2002, application Ser. No. 09/272,056, filed Mar. 18, 1999, application Ser. No. 09/405,741, filed Sep. 24, 1999, and application Ser. No. 09/490,783, filed Jan. 24, 2000, the disclosures of which are hereby incorporated herein by reference in their entireties.

BACKGROUND OF THE INVENTION

1. Field Of The Invention

The present invention includes but is not limited to methods and systems for providing security for corporate payments through a corporate bank (hereafter, Financial Service Provider or FSP) to a payee such as corporate partner (hereafter, Trading Partner or TP). The case of the Financial Service Provider (FSP) is included in order to illustrate and clarify this disclosure. The present inventions also relate to methods and systems for incorporating indicia of authority within digital certificates.

2. Description Of The Prior Art And Related Information

Every corporation may be presumed to have a Chief Executive Office (CEO), Chief Financial Officer (CEO) or a person or persons that operate in that capacity. Such a person typically designates employees with authority to approve payments and/or authorize the FSP to make payments to the TP for goods and/or services provided by the TP to the corporation. To prevent fraud or mistake, such payments should be approved before the corporation's account with the FSP is debited. Preferably, the person or mechanism established to approve such pending payments should be authenticated (their identity verified to insure that the person or mechanism is who or what he, she or it purports to be) prior to the payment to the TP being released. Authentication is required for an FSP to perform financial service related transactions. There are several means of securing authentication, including passwords, smart cards, certificates, and even biometrics measurements such as retinal scans or voice recognition. Of these, the use of certificates and digital signatures, smart cards, and biometrics are referred to as "strong" levels of security, while the ordinary password-protected access is deemed "weak" by typical financial institutions and security experts.

Applications that generate payment requests to an FSP conventionally do not assume any responsibilities for strong authentication, being only the means by which a representative of a corporation generates non-XML files to send to and from FSPs and sellers. Conventional systems work, but do not meet the higher standards that banks set for electronic business banking. Strong authentication beyond the typical id and password pair is needed.

All current payment options, whether credit card or EFT, put the responsibility on the corporation to assure its own security and proper use of the payment system. Only the supposed source of a message from the corporation vouches for the authenticity of the payment request. As can be appreciated from the above, there is a need to prevent fraud and to control access to and use of payment requests generating computer application.

The primary corporate payment instruments are: paper checks, Electronic Funds Transfer (EFT), EXtensible Markup Language (XML) messages, credit cards, and purchase cards. Each payment instrument has its existing set of security models, yet none of them are totally satisfactory. All existing security models focus on given payment instruments, largely to the exclusion of the others. Alternatively, security risks vary widely among these methods of payment. Paper checks have the longest tradition as a payment method, which usually consists of the matching of a signature on the check against a signature on a signature card. Some checks of high value may require two signatures to be valid. However, for efficiency reasons, signatures are not commonly examined by the FSP as they are processed, except perhaps to insure that the correct number of signatures is present. If the account has sufficient funds, the check will usually clear regardless of signature. The corporation, then, must discover any discrepancies during a reconciliation process, applying to the FSP to reverse check and charges as appropriate. This results in contention between the FSP and the corporation, as the FSP tries to shift assumption of the risk of bad checks to the corporation, while the corporation typically believes the FSP should assume this responsibility. This is an ongoing problem for many corporations and their FSPs.

In a typical scenario, the FSP receives checks for clearing against the corporation's account until 2 pm (for example) each day. In addition, the FSP accumulates pending payment requests from servers used by the corporation. Such requests may not have digital signatures. If they do not, the FSP typically has no non-repudiable means of determining the legitimacy of the payment request. The paper checks received for clearing against the corporation's account may or may not be legitimate. FSPs typically no longer inspect signatures and compare them against signature cards unless they have received a specific request to do so. At the end of the business day (such as at 5 pm, for example), the FSP debits the corporation's account for the amounts in the received payment requests and correspondingly credits the accounts of the purported payees. The FSP will then typically print a statement at the end of the month and send it securely to an authorized person at the corporation for reconciliation against the corporation's accounting system.

EFTs are customarily handled by agreement between corporations and their FSPs, with some electronic banking systems permitting EFTs. Some EFTs and corporations rely on security based upon a combination of an ID and a password, with or without private networking (such as a Virtual Private Network or VPN) and Public Key Infrastructure (PKI) certificates. EFT security typically requires a signature on paper to back up whatever other security means have been selected. Moreover, the measures aimed at securing EFTs are usually applicable only to EFT payments.

XML payments are under development by a variety of providers of services and technology. Typically, an XML payment system will include authorization through PKI certificate by a person identified through the certificate. The ancillary procedures, that is, the means by which certificates are generated and distributed, varies widely—in some cases, third party vendors participate in the security arrangements. Most such XML efforts have FSP sponsorship and may be presumed to have very high standards of security. None of the known systems for XML security either integrate with corporate Enterprise Resource Planning (ERP) systems or internal FSP procedures.

Credit cards are discrete instruments designated by an account number and an expiration date, both of which are known to the holder of the card. Unfortunately, these are easily learned by others and credit cards have historically not been regarded has having strong security. Federal law requires FSPs to assume responsibility for unauthorized charges over $50. However, FSPs would like to find others (usually the vendor who accepted the card—the payee) to take responsibility for the unauthorized charge. The usual control is that purchases made with credit cards are subject to predetermined limits. The only security measure usually associated with credit cards is that the merchant will verify by signature/picture on the physical card before submitting the purchase request to the card issuer. However, merchants rarely, in practice, compare the signature on the receipt with that appearing on the card. Moreover, such thin security measures are not typically available for purchases made over the telephone or Internet. Credit card fraud is a major problem in the U.S. and an even greater problem elsewhere. Such fraud affects both business and personal payments.

Purchase Cards (Pcards) are corporate credit cards that have high limits relative to credit cards. Pcards may be physically implemented as plastic cards, but their main function lies in supporting payments for corporate purchases over the facsimile, telephone or the Internet. The security provisions for Pcards vary widely, with ID/password being the highest level and none at all (use of the card number on a paper form) being the lowest.

Corporate use of credit cards and Pcards usually costs the corporation and the TP some fee paid to the FSP. Unlike consumer credit cards, the main risk involves fraud or improper use by unauthorized individuals rather than non-payment by the holder of the card. Even so, corporate losses could be considerable, as could those of the FSP. The TP is in a quandary, since there is no basis other than the means of communication for believing that a card number is valid and is being properly used. Faxed orders with the credit card number on the fax would be an example of security for the TP.

When requests for payment are received by a financial institution from a certificate holder, the sender of the message incorporating the request for payment may be authenticated by means of the certificate presented. However, for lack of alternative, the recipient of the message incorporating the request for payment and the certificate makes the assumption that the person so authenticated has also been authorized to represent and bind the company, which company is assumed to be the person's employer. Changes in the status of employment of that person (such as, for example, suspension, demotion, termination or promotion) or of the privileges granted to the certificate holder (such as signature authority) most often will materially affect the certificate holder's authority to bind his or her employer. Changes to the person's status of employment and/or authority often lag behind the continued use of the certificate. In other words, the person may have been recently terminated or suspended and that change in status may not be reflected in his or her certificate for an indeterminate period of time, thereby exposing the corporation to liability for transactions initiated or otherwise carried out by the employee through the issuance of one or more messages to the corporation's FSP. When an individual's authority is stored in a directory, changes to an individual's data within such a directory may not be preserved as a history of transactions, and the CA may have no information at all as to the authorization level of an individual employee. These issues make fraud on the company relatively easy to accomplish, such as when a recently terminated employee uses an otherwise valid certificate to issue payment requests to an FSP. The FSP may verify the validity of the certificate presented and carry out the payment instructions, with little or no recourse available to the company that has become bound by this fraudulent transaction.

An important goal of FSP in handling such transactions is, therefore, to insure that they are non-repudiable. The goal of non-repudiation is to prove that a particular transaction took place at the behest of a duly authorized representative of a company, so that liability for the transaction stays with the originator of the transaction (the company) and not the party who executed the transaction (the FSP). A non-repudiation feature establishes accountability of information about a particular event or action to its originating entity. This is an important security measure, as users are increasingly called upon to sign contracts for certain transactions or events; and FSPs want assurances that no FSP client will be able to repudiate such events, to thereby shift the liability for the transaction back to the FSP. To insure non-repudiation of transactions carried out by a financial application of the company, FSPs should require that those originating message-based transactions are unambiguously identified and authorized to do so. Server to server security is insufficient to meet this goal.

What are needed, therefore, are methods and systems for insuring strong security for all forms of corporate payments. From the foregoing, it is also clear that authentication alone is not sufficient to insure non-repudiation of actions taken by an FSP on behalf of its clients. What are needed, therefore, are methods and systems to insure that those who originate actions with an FSP are, in fact, authorized to originate such actions. What are also needed, therefore, are standards for strong authentication and quantifiable authorization operable in a distributed networked computing environment.

SUMMARY OF THE INVENTION

1. According to an embodiment thereof, the present invention is computer readable code readable by a computer system in a computing environment having a connection to a network, for enabling a server computer within the computing environment to both authenticate a user of a client computer within the computing environment and to verify that the user is authorized to request that the server computer carry out a requested action, comprising a digital certificate assigned to the user of the client computer, the digital certificate comprising a first code portion and a second code portion, wherein the first code portion of the digital certificate is configured enable authentication of the user, the first code portion defines a public key, a certificate serial number, a certificate validity period, a digital signature of the certificate authority, and an extension field, and wherein the second code portion of the digital certificate is configured to define an authority of the user of the client computer to request that the server computer carry out the requested action, the second code portion being configured for inclusion within the extension field of the first code portion, the authority of the user defined within the second code portion of the certificate being verifiable by the server computer independently of the digital certificate.

The digital certificate may conform to the X.509 standard, for example. The second code portion may be configured as XML code, for example. The XML code may be compliant with a DSML standard, for example. The authority of the user of the client computer may be stored in a hierarchical authority data structure that is accessible by the server computer. The authority of the user defined within the second code portion of the certificate may be verifiable by the server computer accessing a store of authority information that is independent of the received certificate. The authority defined within the second code portion may define access rights of the user to data and programs within the computing environment. The authority defined within the second code portion may define rights of the user to issue payment requests.

According to another embodiment thereof, the present invention is a computer-implemented method for ensuring non-repudiation of a payment request, the payment request being generated in a computing environment having a connection to a network, the method comprising the steps of receiving, over the network, the payment request together with a certificate identifying a user having caused the payment request to be generated, the certificate including certificate-identifying information and user-identifying information, the certificate further including authority information defining an authority of the user to make the payment request; validating the certificate-identifying information and the user-identifying information included within the received certificate; validating the authority information included within the received certificate, and executing of the payment request only when the certificate-identifying information, the user-identifying information and the authority information within the received certificate may be successfully validated.

The payment request may be for a predetermined amount and the payment request may be authorized only when the validating steps are successful and when the authority information for the user stored in the hierarchical authority data structure lists an authorized amount for the user at least equal to the predetermined amount. The certificate received in the receiving step may conform to the X.509 standard, for example. The authority information may be configured as XML code, which may be compliant with a DSML standard, for example. The authority information may be validated by accessing a store of authority information that may be independent of the received certificate.

According to still another embodiment, the present invention is a software application configured to carry out a financial transaction, the application being configured to run on a computer coupled to a network, and comprising, stored on a computer-readable medium: certificate receiving code which may be configured to receive a digital certificate from a user over the network, the certificate including certificate-identifying information and user-identifying information, the certificate further including authority information that may define an authority granted to the user to request that the financial transaction be carried out; certificate validating code configured to enable validation of the certificate-identifying information and user-identifying information within the received certificate, and authorization validating code configured to enable validation of the authority information within the received certificate against corresponding authority information for the user stored in a data structure that may be independent of the received certificate.

The digital certificate may conform to the X.509 standard, for example. The authority information may be configured as XML code, which may be compliant with a DSML standard, for example. The authority defined by the authority information within the received certificate also may define rights of the user to access predetermined data and programs within the network.

The present invention, according to still another embodiment thereof, may be a computer-implemented method for controlling authority of employees of a company within in a computing environment, the company having a hierarchical management structure, the method comprising the steps of creating or receiving a primary digital certificate, the primary digital certificate including primary authority information that may define and grants primary rights to a primary employee as defined by the hierarchical management structure; creating secondary digital certificates and assigning the created secondary certificates to selected secondary employees requiring access to the computing environment, each of the selected secondary employees occupying a predefined position within the hierarchical management structure that may be hierarchically lower than that of the primary employee, each of the secondary certificates including secondary authority information that may define and grants secondary rights, the secondary rights being derivative from the primary rights and being commensurate with the predefined position of the selected secondary employee within the hierarchical management structure, and allowing each selected secondary employee to exercise only those rights within the computing environment that are granted by the secondary rights defined within the assigned secondary certificate. In addition, the grant of authority by the primary employee may be subject to one or more computer-readable recorded and retained approvals by the manager(s) of the primary employee.

The primary and secondary certificates may conform to the X.509 standard, for example. The primary and secondary authority information may be encoded within the primary and secondary certificates as XML code, which may be compliant with a DSML standard, for example. The secondary rights defined within at least one of the secondary certificates may be derivative from secondary rights defined within another secondary certificate. The method may further include a step of revoking a secondary certificate to a terminated secondary employee, the revoking step being operative to revoke all certificates to secondary employees of the company that report to the terminated secondary employee, which revokes all secondary rights that are derivative from the secondary rights granted by the revoked secondary certificate. The method may also include a step of revoking a secondary certificate to a terminated secondary employee, the revoking step being operative to revoke all secondary rights that are derivative from the secondary rights granted by the revoked secondary certificate. The primary and secondary rights may define access rights to data and/or programs, for example, within the computing environment. The primary and secondary rights may each define amounts to which the primary and each of the secondary employees, respectively, are authorized to bind the company.

BRIEF DESCRIPTION OF THE DRAWINGS

FIG. 4A is a diagram of a certificate and database combination that may be employed in the method and system for securing corporate payments, according to an embodiment of the present invention.

FIG. 4B is another diagram of a certificate and database combination that may be employed in the method and system for securing corporate payments, according to another embodiment of the present invention.

FIG. 5 is a flowchart of a method of securing corporate payments, according to an embodiment of the present invention.

DETAILED DESCRIPTION

Definitions

Figure 1:
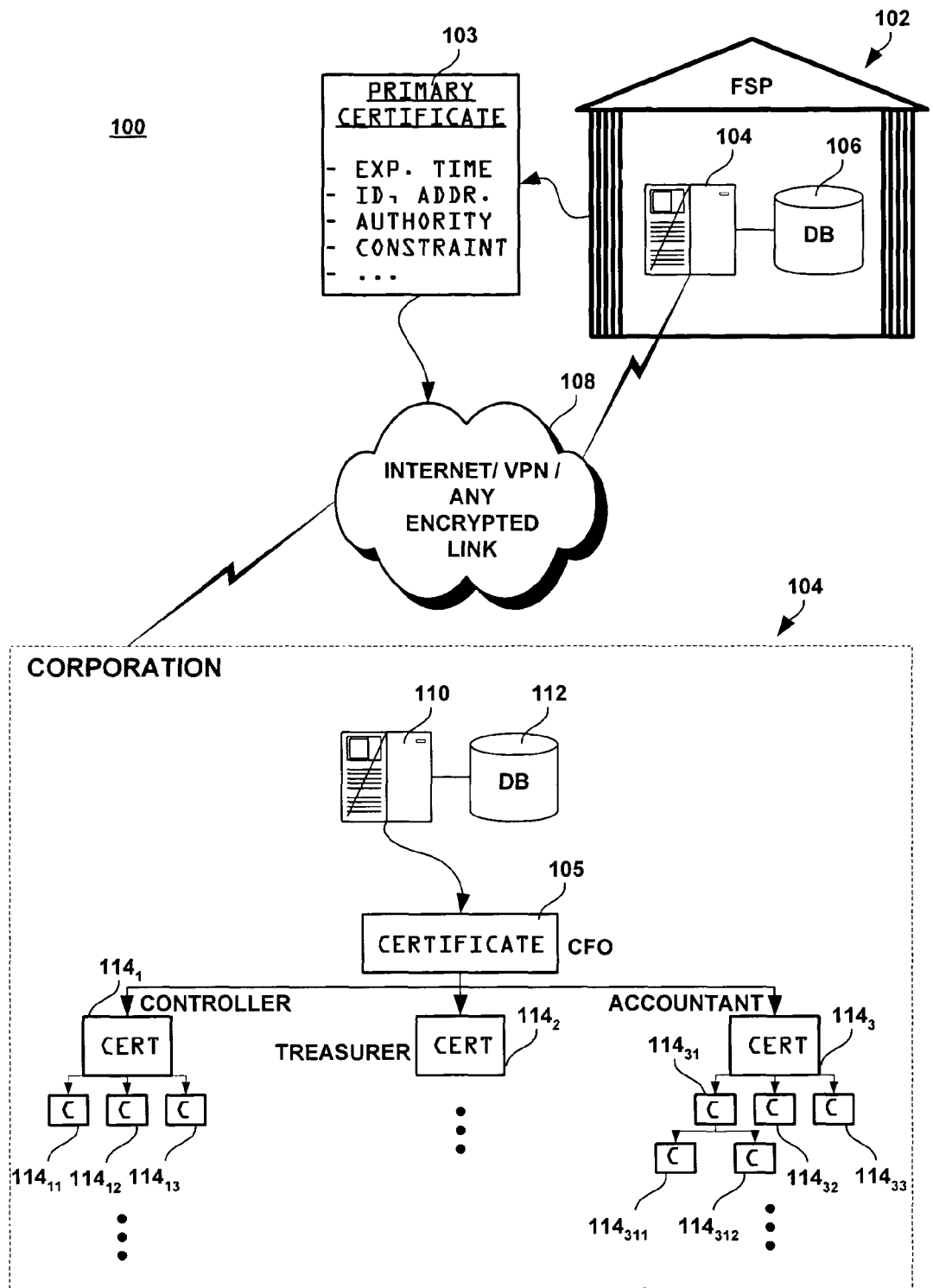
FIG. 1 is a representation of aspects of the system and method for securing corporate payments, according to an embodiment of the present invention.

Authentication: A procedure for verifying a prospective user's identity. Authentication should verify that prospective users (both persons and machines—e.g., servers) are who they claim to be and that their privileges are appropriate for the level of access requested. Non-repudiation is a key goal of authentication. Authentication is preferably the responsibility of the FSP.

Certificates: A certificate is a message containing the public key, the detailed information about the owner of the key, the expiration date of the certificate, and optionally additional application-specific data. Typically, the certificate is digitally signed by a trusted Certificate Authority (CA). The resulting certificate electronically ties the real identity of the user to the public key, which will be used for authenticating users.

Certificate Authority (CA): A certificate is digitally signed by a trusted third party, the CA. The CA is an organization that issues and manages the certificates and is trusted by both the sender and the receiver. The certificate signed by the CA electronically ties the real identity of the user to the user's public key. According to embodiments of the present invention, the CA may be a bank or some other financial services provider, a commercial entity (such as VeriSign, for example and/or some other legal entity.

Directory Services Markup Language (DSML): DSML is a standard that puts LDAP information (authorization, identification, and access privileges) into a message format compatible with XML.

eXtensible Markup Language (XML): XML is the W3C standard for information exchange on the Internet. Adoption of XML simplifies information exchange between applications and provides great flexibility in how information is presented and used by end users.

Financial Services Provider (FSP): Herein, the terms "FSP", "financial institution" and "bank" are used interchangeably and shall be understood to include all financial services institutions accepting deposits of cash, negotiable securities, marketable shares/stock into numbered (or otherwise uniquely-identified) accounts and honoring checks, drafts and/or other customer instructions. Such a definition includes (but is not limited to) traditional banks and savings institutions, stockbrokers, online trading concerns, credit unions and any institution or trusted entity that legally identifies with and has some financial relationship with an account holder and that has the ability to honor customer or account holder instructions referring to specific accounts. The applicability of the present invention extends also to such institutions as post offices or other governmental agencies that carry out banking or quasi-banking functions, assuming that such institutions and agencies maintain numbered (or otherwise uniquely identified) accounts and require proof of identity similar to that required at banks; namely, in person signature to set up the numbered account at the institution and agreeing to the terms of service for participation in the system according to the present invention. The Internal Revenue Service (IRS) may be thought of as another example of such a governmental agency.

Non-Repudiation: Non-repudiation is a characteristic of security systems that keeps a user from denying actions attributed to that user. The goal of a non-repudiation service is to prove that a particular transaction took place at the behest of a duly authorized representative of a company. A non-repudiation feature establishes accountability of information about a particular event or action to its originating entity. This is an important security measure, as users shall be required to sign contracts for certain transactions or events; it is essential that no FSP clients shall be able to repudiate such events. Together with authentication and evidence of authorization, non-repudiation insures appropriate access for individuals with a known identity and known privileges and characteristics. To prevent repudiation, it is essential that only authorized individuals (e.g., employees) are allowed and are able to send messages that may bind the corporation, thereby obligating the corporation to both acknowledge and adhere to the underlying transaction.

Public Key Infrastructure (PKI) PKI is an example of a strong authentication mechanism that uses a trusted third party for encrypted certification services. PKI is a technology for securing data that uses two related keys (called the public key and the a private key that is mathematically related to the public key), which together form a key pair. Public keys are made available to everyone, but each entity that holds a key pair should keep their private key secret. If data is encrypted using one of the keys, it will only be decrypted using the other, and vice versa.

Secure Socket Layer (SSL): SSL is a standard protocol for implementing cryptography and enabling secure transmission on the Web. The main goal of the SSL protocol is to provide privacy and reliability between two communicating parties. Symmetric cryptography is used for data encryption, while asymmetric or public key cryptography is used to encrypt the shared encryption key when an SSL session is established. This security protocol is available to users through their browsers.

FIG. 1 is a representation of the system 100 and aspects of the method for securing corporate payments, according to an embodiment of the present invention. As shown therein, reference numeral 102 represents the FSP and reference numeral 104 represents a corporation or other legal entity that maintains one or more accounts with the FSP 102. The FSP 102 and the corporation 104, according to the present invention, exchange information over a network 108. The network 108 may include, for example, the Internet, a Virtual Private Network (VPN) and/or any secure (e.g., encrypted) link or channel. As shown in FIG. 1, the FSP 102 may maintain one or more servers 104 and one or more databases 106. The database 106 may include the personal, business and/or account information of its account holders. Similarly, the FSP 104 may maintain one or more servers 110 coupled to one or more databases 112. The database 112 may store, for example, the corporation's accounting information.

The systems and methods according to the present invention may be referred to as Multiple Electronic Money Payment HighLevel Integrated Security (MEMPHIS). MEMPHIS includes systems and methods for providing a high level of security for all corporate payment, irrespective of the mode of payment (excepting cash). The present MEMPHIS systems and methods require prior agreement between the corporation and its FSP (the FSP at which the corporation maintains funds on deposit in a numbered account or accounts or at which the FSP maintains a letter of credit or other credit arrangement) or equivalent parties, after which the FSP or a party equivalent to it may offer the corporations or equivalent parties the extended security features of the present invention.

Payments are all subject to clearing at the corporation's FSP. That is to say, the corporation requests (through the use of any payment modality such as, for example, check, credit card, purchase card, EFT or XML-based message) that the FSP debit the corporation's account and pay some identified payee an amount of money (or other consideration) stated in the payment request. Such payment requests arrive at the FSP 102 for clearing (payment) against the corporate account. Instead of automatically clearing these payment requests as they arrive (singly or in batch) against the corporate account(s) without further intervention from the corporation or a representative thereof, the present invention calls for the FSP 102 to collect the payment requests in a batch while they are still pending. That is, the FSP 102 intercepts the payment requests before they are cleared against the corporate account(s) and collects them in a batch. Thereafter, the FSP 102 may periodically generate a pending payment statement that includes the collected pending payment requests. The pending payment statement that is generated by the FSP 102 may include all of the pending payment requests that arrived at the FSP 102 since the last pending payment statement was generated. Alternatively, more than one pending payment statement may be generated by the FSP 102, each including selected payment requests that have arrived at the FSP 102 during a specified period of time.

According to an embodiment of the present invention, the FSP 102 requires that each of the payment requests collected in the pending payment statement be validated by the corporation 104 before each payment request is allowed to clear the corporate account. This validation may be accomplished by online, automated reconciliation. If the corporation 104 has entered the payment in its accounting system, with privileged, secured by means of this present invention, and networked access available to the FSP, the FSP may assume that the payment request is legitimate and sent from a duly authorized employee of the corporation. In this manner, the corporation 104 is protected against fraudulent or erroneous payment requests before payments thereon are made and the FSP 102 is protected against claims by the corporation 104 of wrongfully clearing fraudulent or erroneous payment requests. According to the present invention, security is insured by means, among other measures, of digital certificates. For example, the certificates utilized within the context of the present invention may include, for example, Public Key Infrastructure (PKI) that enables an identified and designated representative or representatives of the corporation to securely exchange information over a network (such as network 108) using a combination of a public and a private encryption key.

As shown in FIG. 1, the present invention calls for the FSP 102 to issue a single primary digital certificate 103 to the corporation 104. The primary digital certificate 103 may be issued to a selected and identified primary certificate holder such as, for example, an officer of the corporation. For example, the primary certificate 103 may be issued by the FSP 102 to a C-level officer of the corporation 104, such as the Chief Executive Officer (CEO) or the Chief Financial Officer (CFO) of the corporation 104. The primary digital certificate 103 may include, for example, the expiration date of the primary certificate 103, the identification of the primary certificate holder (including any personal or identifying information such as the holder's address for example), the authority granted to the primary certificate holder and any constraint(s) placed upon the primary certificate holder (such as limits on access in a secure accounting system, for example). According to the present invention, the authority of the primary certificate holder may be defined in terms of an amount (in dollars, for example) of a payment request that the primary certificate holder is authorized to approve. The authority of the primary certificate holder may be very high or effectively unlimited. As such the primary certificate holder should be a trusted person within the corporation 104, as he or she will have the authority to approve very high payment requests that will bind the corporation and that most likely will be non-repudiable after clearing the corporate account. According to the present invention, the primary certificate 103 authorizes (but does not require) the primary certificate holder to designate a plurality of secondary certificate holders 105, $114_1$-$114_n$. The secondary certificates 105, $114_1$-$114_n$ are derivative from the primary certificate 103 and each includes unique identifying information uniquely identifying the secondary certificate holder to whom the secondary certificate 105, $114_1$-$114_n$ is issued and/or the authority of the secondary certificate holder. At least the secondary certificates 105, $114_1$-$114_n$ may be generated by software provided the corporation by the FSP 102, whether such certificate-generating software runs from the corporation's server 112 and/or the FSP's server 106. According to an embodiment of the present invention, the FSP 102 is the Certificate Authority and the corporation 104 is the Derivative Certificate Authority, controlling the issuance, assignment and distribution of secondary certificates 105, $114_1$-$114_n$ among its employees (and/or other trusted entities) as it delegates authority and access privileges with regard to its financial systems and records.

Whereas the primary certificate holder may be granted the highest access privileges (all corporate accounts, potentially unlimited approval authority), the secondary certificate holders may be granted selectively more limited access privileges. Indeed, the rights associated with the secondary certificates 105, $114_1$-$114_n$ may roughly follow the hierarchical organization structure of the corporation, for example. For instance, the CFO may be granted very high access privileges and payment request approval limits, whereas those who report to the CFO (accountants, bookkeepers, accounts payable personnel) may be granted comparatively lesser access privileges and/or approval limits.

Periodically, the FSP requires that each of the payment requests collected in the pending payment statement be validated by the corporation before each payment request is allowed to clear the corporate account. That is, by agreement between the FSP 102 and the corporation 104, the FSP 102 holds up payment on each payment requests until and if the payment request is eventually validated (e.g., payment authorized) by an authenticated primary or secondary certificate holder having the authority to validate the payment request. Alternatively, the FSP may have secure, privileged access over a network to automated records indicating that an authorized individual did issue the payment request in question (instant online reconciliation). Indeed, according to an embodiment of the present invention, there may be two conditions for the FSP 102 to release payment on a payment request by the corporation 106 to an identified payee. The first such condition may be a proper authentication of the certificate holder and the second such condition may be that the secondary certificate 105, $114_1$-$114_n$ defines an authority level that is sufficient to validate the payment request. Such authority may include, for example, a maximum monetary amount that the secondary certificate holder is authorized to approve or may define those payees for whom the secondary certificate holder is authorized to validate payment requests, among other possibilities. Rules which a corporation enacts and shares with its FSP may be applied by the FSP or ascertained by the bank to have been applied already to records accessible to the FSP. Both authorization and specific item approvals (such as a requirement for more than one signatory to a stated class of payment requests) may be included among such rules.

The authentication measures to authenticate the primary or any of the certificate holders may take several forms. The FSP 102 may authenticate the primary certificate 103 and the corporation 104 may authenticate the secondary certificates 105, $114_1$-$114_n$. That is, the FSP 102 and/or the corporation 104 may insure keep an on-going record of each issued, expired, revoked or changed certificate, as well as the access privileges and authority defines therein.

Thereafter, the FSP 102 and/or the corporation may insure that the certificate presented upon validation of the payment requests of the pending payment statement are valid, current and uncorrupted. Audit is also enabled, in that any dated transaction may be evaluated against an employee's authorization at that point in time, given that the above cited certificate history is maintained. Any other security measures may be implemented by agreement between the FSP 102 and the corporation 104. For example, the corporation's server 110 and the FSP's server 104 may each exchange certificates (server-to-server certificates) with one another during the communication session therebetween. The server-to-server certificates used in communication between the servers 104, 110 are preferably different from the primary and secondary certificates 103, 105, $114_1$-$114_n$ used by the corporate employees to validate pending payment requests. Both, however, have the effect of raising the security of communications between the FSP 102 and the corporation 104 to a very high level that is uniform across all payment modalities. Additional measures may be deployed to increase security such as, for example, the collection and analysis of biometric data (fingerprints, voice prints, retinal scans and the like, for example) of certificate holders seeking to validate pending payment requests. Such biometric data may be acquired and compared with previously collected data stored in the corporation's database 112 and/or the FSP's database 106. For example, the corporation 104 may require that the secondary certificate holder give his or her thumbprint and pass a first authentication in this manner before being allowed to present his or her secondary certificate 105, $114_1$-$114_n$ to validate payment requests within the scope of his or her authority, as defined in his or her secondary certificate. Other security measures may be implemented unilaterally by the FSP 102 and/or the corporation 104, or bilaterally, by mutual agreement between the FSP 102 and the corporation 104.

Figure 2:
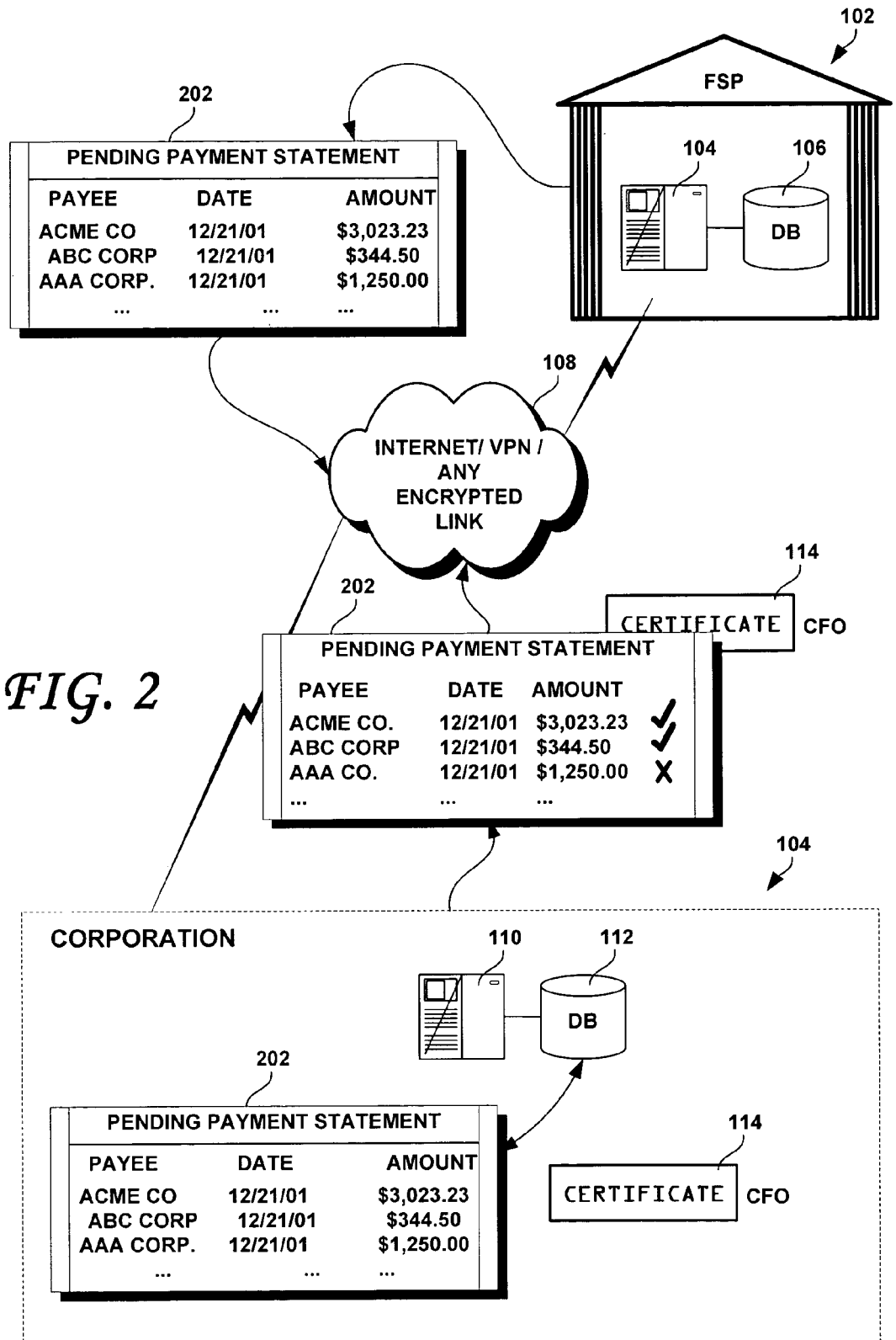
FIG. 2 is a representation of further aspects of the system and method for securing corporate payment, according to an embodiment of the present invention.

FIG. 2 is a representation of further aspects of the system and method for securing corporate payment, according to an embodiment of the present invention. As shown therein, an embodiment of the present invention calls for the FSP 102 to periodically generate a pending payment statement, an illustrative example of which is shown at reference numeral 202. The pending payment statement 202 may be generated at regular intervals such as, for example, every day at 2:00 pm. The pending payment statement may also be generated on request by an appropriately authorized query from the corporation's employee to its FSP. In these cases, the pending payment statement includes all payment requests made by the corporation 104 and received by the FSP 102 since the previous pending payment statement 202 was generated and/or those pending payment requests that have not yet been validated by a properly authenticated primary or secondary certificate holder of the corporation 104. The generated pending payment statement 202 may then be sent to the FSP 104 over the network 108, which may be or include the Internet, a VPN negotiated between the corporation 104 and the FSP 102 or any encrypted link such as, for example, a Secure Socket Link (SSL). Other means of securing the communication channel between the FSP 102 and the corporation will occur to those of skill in this art. Once received by the server 110, the constituent payment requests of the pending payment statement 202 may then be authenticated by one or more of the primary and secondary certificate holders of the corporation having the proper level of authority. In the illustrative example of FIG. 2, the CFO presents her secondary certificate 114, is authenticated by the corporation 104 and/or the FSP 102 and is authorized to validate (or not) each or selected ones of the constituent payment requests of the pending payment statement 202. According to the present invention, the validation of the pending payment requests may be made at least partially programmatically; that is, by matching each of the payment requests of the pending payment statement against a matching entry in the corporation's accounting system. Optionally, all or some of the pending payment requests may be validated by visual inspection by an authenticated human primary or secondary certificate holder. Several levels of validation may be necessary. In the case of FIG. 2, the payment requests to Acme co. and ABS Corp. have been validated by the CFO as a secondary certificate holder (or programmatically matched against a corresponding record in one or more accounting tables accessed by the corporation's accounting system in the database 112) and reviewed by the CFO. The payment requests to Acme Co. and ABC Corp., therefore, have check marks next to them, to indicate validation of the request by a properly authenticated certificate holder. In the example shown in FIG. 2, however, the payment request to AAA Corp. has been flagged as potentially problematic and has not been validated. This may be because the corporation 104 does not have any record of having issued a payment request to AAA Corp, or some other aspect of the payment request does not match the corporation's accounting records. For example, the payment request to AAA Corp. may appear in the pending payment statement 202 with an incorrect date, an incorrect amount or may have been generated by a person not authorized to generate a payment request for this vendor. Alternatively still payments to this vendor may be held up (prevented from clearing the corporate account) for other reasons including, for example, that AAA Corp. delivered non-conforming goods to the corporation 104, is in arrears with the corporation 104 or a host of other potential reasons. For example, the payment request may be entirely fraudulent, and may have been secretly generated by an employee of the corporation 104. In prior art systems, such a fraudulent payment request may have been allowed to clear the corporation's account at the FSP 102, leaving the corporation 104 to dispute the payment with the FSP 102 or to absorb the loss itself, without further recourse (at least against the FSP). The interruption of the payment process prior to clearing, according to the present invention, signifies that fraudulent or erroneous payment requests are not paid before they are discovered. Further test(s) of the validity and/or authenticity of any payment request may be agreed upon by the corporation 104 and the FSP 102. The FSP may then be notified of any suspicious payment instruments and can hold off paying (clearing) such suspicious payment requests until a resolution of the matter is arrived at between the FSP 102 and the corporation 104.

Figure 3:
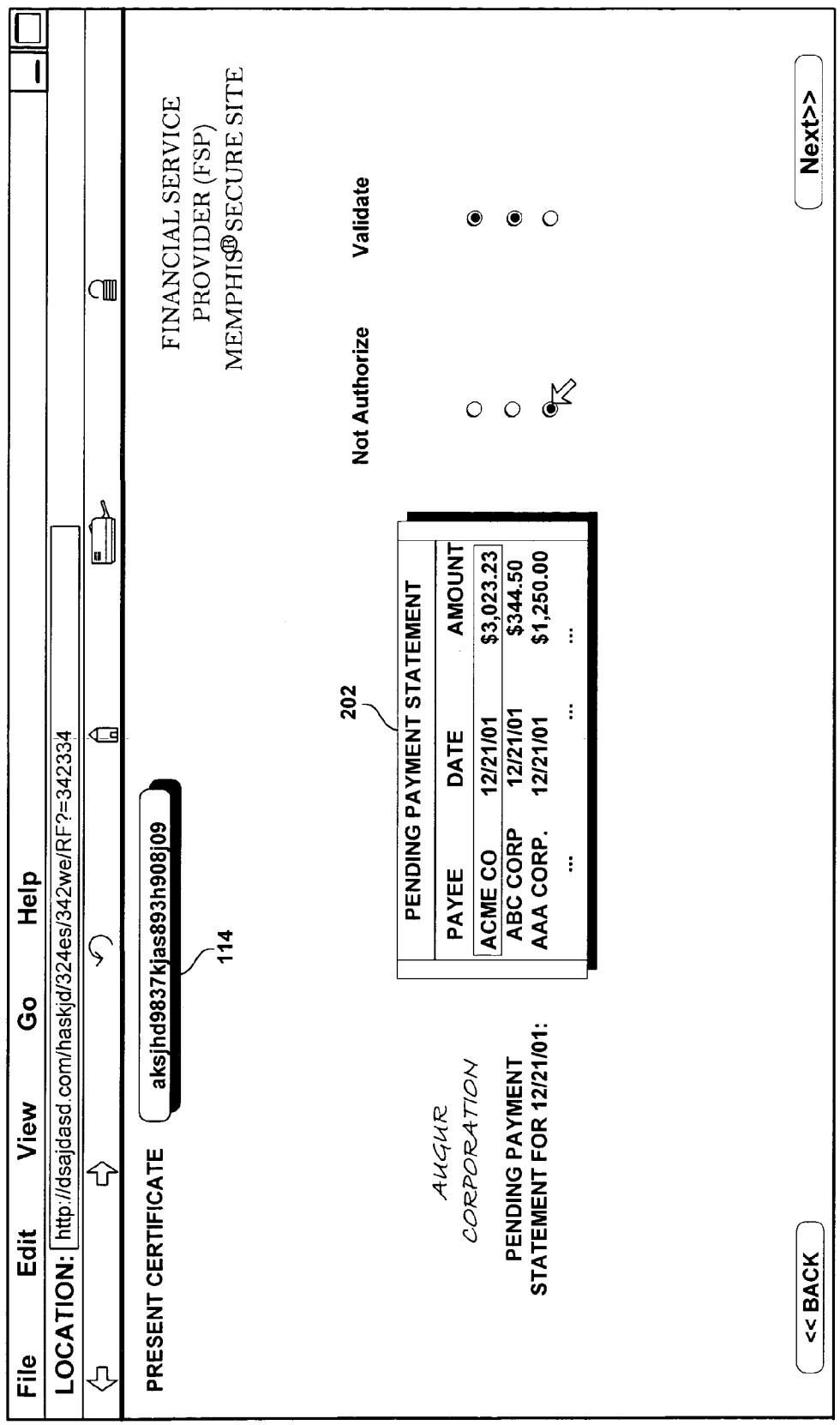
FIG. 3 shows a Web browser showing aspects of the present system and method, according to another embodiment thereof.

FIG. 3 shows a Web browser showing aspects of the present system and method, according to another embodiment thereof. As shown therein, instead of the FSP sending the pending payment statement 202 over the network 108 to the corporation 104, the primary or one of the secondary certificate holders may log onto a secure Web site 300 maintained by the FSP 102. Upon presenting the primary certificate or one of the secondary certificates (certificate 114 being shown in FIG. 3), and being properly authenticated by the FSP 102, the certificate holder may be presented with the pending payment statement 202. The pending payment statement 202 shown to the certificate holder may include only those pending payment requests that fall within the scope of the authority and/or access rights defined in the presented certificate. In this manner, each certificate holder may be presented only with those pending payment requests that he or she has been granted the authority to validate. By means of a mouse click or other user interaction means, the logged on certificate holder may visually inspect the pending payment requests and/or cause the same to be programmatically validated, again subject to the scope of authority defined in the presented certificate. Thereafter, the FSP 102 may clear the validated pending payment requests (pay them from the corporation's funds on deposit and/or draw down a line of credit or other instrument, by agreement between the FSP 102 and the corporation 104). According to an embodiment of the present invention, in response to the presentation of the certificate, a single sign on programmed login may be carried out. Upon logging in, the certificate holder would be automatically given access to all databases and applications authorized by the scope of the authority defined in his her certificate. All desired databases and applications may be selected from a single login page.

FIG. 4A is a diagram of a certificate and database combination that may be employed in the method and system for securing corporate payments, according to an embodiment of the present invention. FIG. 4A shows that the identity of the certificate holder need not be stored in the certificate, but may be stored in the FSP's database 106 and/or in the corporation's database 112, leaving the primary certificate 103 and/or the secondary certificates 105, $114_1$-$114_n$ defined in the certificate. Alternatively, the authority of the certificate holder may be stored in one or both of the databases 106, 112 while identifying information uniquely identifying the certificate holder may be stored in the primary certificate 103 and/or the secondary certificates 105, $114_1$-$114_n$, as shown in FIG. 4B. Upon being presented with a certificate, the corporation 104 and/or the FSP 102 may match the information stored in the presented certificate with corresponding information stored in the database 106 and/or 112 to authenticate the certificate holder. Similarly, the certificate holder's database access rights may also be defined and stored in the certificate and/or one or more of the databases 106, 112.

FIG. 5 is a flowchart of a method of securing corporate payments, according to an embodiment thereof. As shown therein the method begins at S501 with a certificate holder requesting access to the pending payment statement (such as shown at 202 in FIGS. 2 and 3) and presents his or her certificate to the FSP 102. This request may be carried out upon logging on the FSP's secure Web site established for this purpose, as shown in FIG. 3. At S502, the FSP 102 receives the certificate, and at S504 determines whether to authenticate the holder and/or the certificate. For example, the FSP 102 may determine whether the certificate is valid (i.e., the certificate is a known, valid and still current certificate) by, for example, matching some or all of the information defined therein with corresponding information stored in the FSP's database 106. If the certificate is not valid, the certificate holder's request to access the pending payment statement may be denied, as shown at S505. If, however, the certificate holder is authenticated, the pending payment statement that includes a list of pending payment requests within the scope of the authority of the certificate holder is provided, as shown at S506. Thereafter, the certificate holder and/or the corporation's accounting system validates (or declines to validate) the constituent pending payments of the pending payment statement, identifying exceptions (being those payment requests that have not been validated and which the FSP 102 should not pay), as shown at S507. Lastly, the FSP 102 pays only those payment requests of the pending payment statement that were validated, as called for by step S508. Alternatively, the FSP may send an encrypted file including the pending payment statement to the corporation over the network 108. Thereafter, those with the proper authority to do so may validate the constituent payment requests thereof and so inform the FSP, by sending the FSP 102 an encrypted file noting the validated payment requests as well as the exceptions (those payment requests that are not validated).

The request for the pending payment statement from the FSP 102 or the sending thereof to the corporation 104 may take place at regular (and preferably rather short) intervals, such as, for example, once every business day, although other frequencies may readily be defined. In this manner, reconciliation may be spread throughout the month, as any time period may be used to collect the pending payment requests and validate them. No further (e.g., end of month) reconciliation need be done once this validation is carried out regularly. Rather, an automatic report at the end of the month detailing the denied and the not yet validated outstanding items might be provided by the FSP to the corporation. The present invention is believed to enable corporations to achieve more precise control of corporate payments, and enables the corporation to eliminate opportunities for payment fraud and a higher level of precision in the corporate distribution of authority, privileges and access rights.

Figure 6:
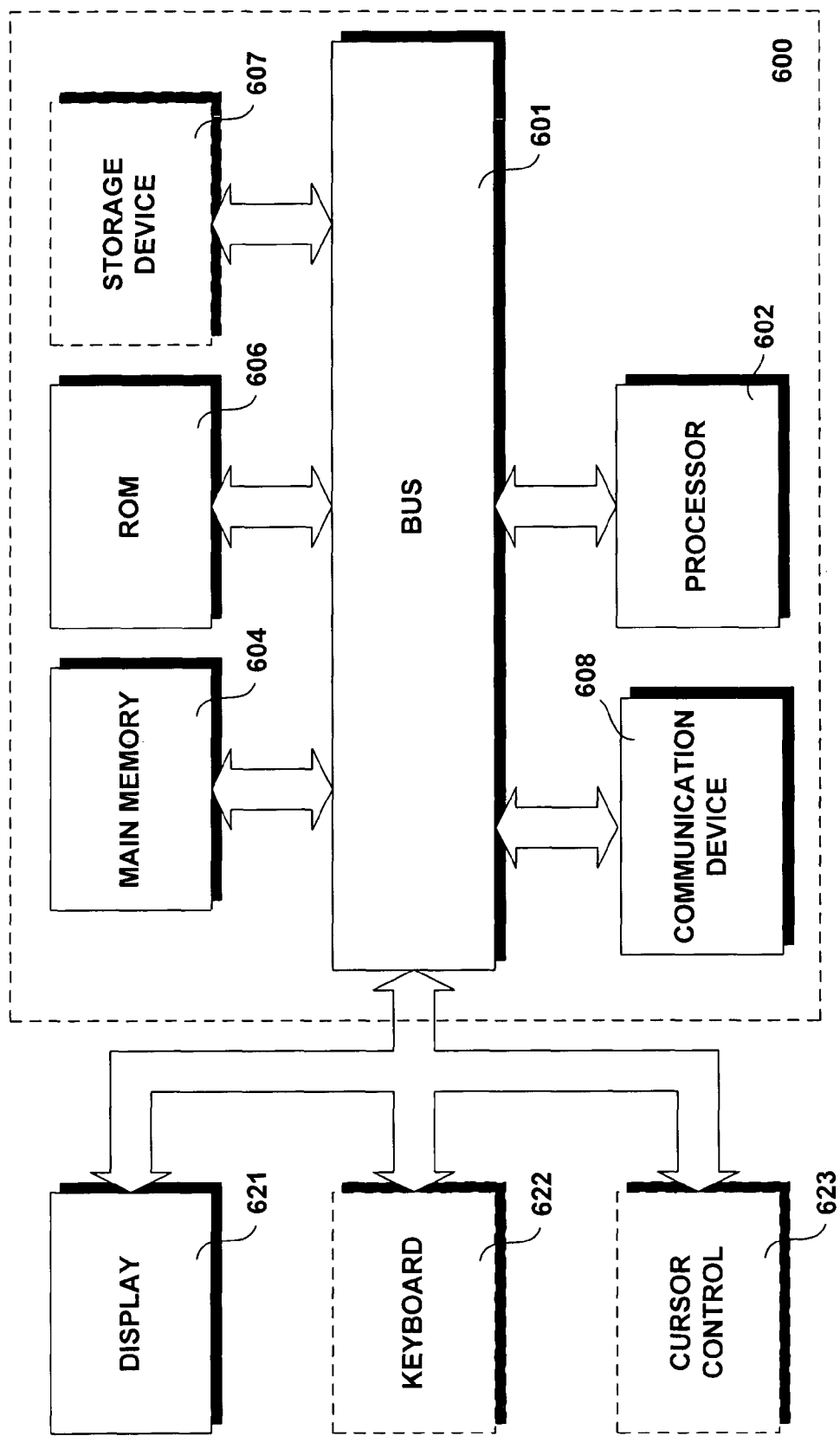
FIG. 6 is a diagram of a computer with which aspects of the present inventions may be practiced.

FIG. 6 illustrates a block diagram of a computing device 600 with which an embodiment of the present invention may be implemented. Computing device 600 includes a bus 601 or other communication mechanism for communicating information, and a processor 602 coupled with bus 601 for processing information. Computing device 600 further comprises a random access memory (RAM) or other dynamic storage device 604 (referred to as main memory), coupled to bus 601 for storing information and instructions to be executed by processor 602. Main memory 604 also may be used for storing temporary variables or other intermediate information during execution of instructions by processor 602. Computing device 600 may also include a read only memory (ROM) and/or other static storage device 606 coupled to bus 601 for storing static information and instructions for processor 602. A data storage device 607, such as a magnetic disk or optical disk, may be coupled to bus 601 for storing information and instructions. A communication device 608, such as a modem or network (such as Ethernet, for example) card may also be coupled to the bus 601 to provide access to a network, such as the Internet, for example.

The computing device 600 may also be coupled via bus 601 to a display device 621, such as a cathode ray tube (CRT), for displaying information to a computer user. An alphanumeric input device 622, including alphanumeric and other keys, is typically coupled to bus 601 for communicating information and command selections to processor 602. Another type of user input device may be the user's own voice or cursor control 623, such as a mouse, a trackball, or cursor direction keys for communicating direction information and command selections to processor 602 and for controlling cursor movement on display 621.

The present invention is related to the use of computing device 600 for securing corporate payments as described herein. According to one embodiment, the processing may be carried out by one or more computing devices 600 in response to processor(s) 602 executing sequences of instructions contained in memory 604. Such instructions may be read into memory 604 from another computer-readable medium, such as data storage device 607 and/or from a remotely located server. Execution of the sequences of instructions contained in memory 604 causes processor(s) 602 to implement the functionality described above. In alternative embodiments, hard-wired circuitry may be used in place of or in combination with software instructions to implement the present invention. Thus, the present invention is not limited to any specific combination of hardware circuitry and software.

Figure 7:
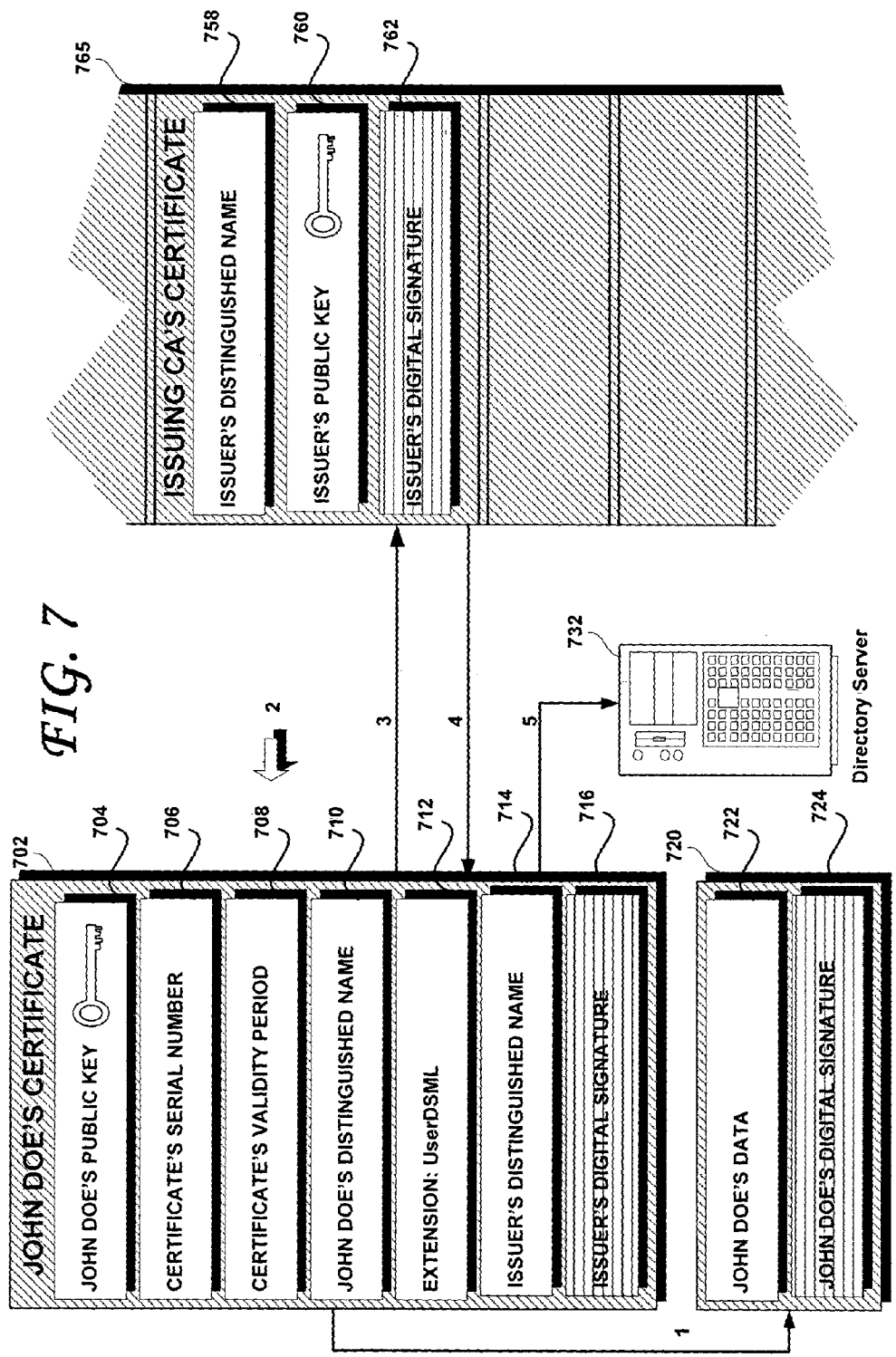
FIG. 7 is a functional representation of aspects of an embodiment of the present invention.

FIG. 7 shows aspects of another embodiment of the present invention. At 765, FIG. 7 shows a list of trusted Certificate Authorities. The list 765 may include a plurality of entries, only one of which is shown in FIG. 7. The shown entry in the list of trusted Certificate Authorities includes an issuer's Distinguished Name (Issuer's DN) 758, the Certificate Authority's public key 760 and the issuer's digital signature, as shown at 762. The Certificate Authorities listed within the list 765 of such trusted Certificate Authorities (hereafter, CA) may be a FSP such as a bank or other trusted entity.

Reference numeral 702 is a graphical representation of a digital certificate according to an embodiment of the present invention, created for a fictitious and exemplary user called John Doe. John Doe, within the context of the present invention, may be considered the holder of the digital certificate 702, a user of embodiments of the present invention, and/or an employee of a company. As an employee of the company, John Doe may hold a predetermined position within the company's hierarchical management structure. For example, John Doe may report directly to the company's CFO, who reports, in turn, to the company's CEO and/or President. An XML message based purchase request (or purchase order, payment instruction, or other financial documents or agreements for example), may be embodied within signed user data 720. In the example shown in FIG. 7, the user data is shown at 722 as "John Doe's Data" and John Doe's digital signature is shown at 724.

As shown, John Doe's digital certificate 702, in a public key infrastructure (PKI) cryptographic system, may be issued by a trusted party, shown in FIG. 7 as the CA. The certificate 702 may, according to an embodiment of the present invention, comply with the ITU-T Recommendation X.509v3 or later versions thereof and/or its progeny. However, the certificate 702 may alternatively comply with other standards, the present inventions not being limited to certificates complying with the X.509 standard. John Doe's certificate 702 may include an attribute such as a unique Distinguished Name (or DN) 714, which is strongly bound (e.g., enciphered) with a public key, such as shown at reference numeral 704. The certificate 702 may also include other attributes and/or fields such as, for example, a certificate serial number 706, the digital signature 7616 of the issuer of the certificate (the CA), the issuer's (the CA) unique distinguished name (DN) 714 and the certificate's validity period 708. The certificate's validity period, as stored in 708, determines the last date of validity of the certificate 70. By comparing the current date with the date stored in the certificate's validity period, for example, the recipient of the certificate may determine at least whether the certificate is current. This determination, together with the validation of other attributes of the certificate 702, determines whether the certificate 702 is to be considered as valid. The certificate 702 may also include other attributes such as, for example, include a certificate version number.

To authenticate John Doe (or at least John Doe's certificate 702 presented along with the user data 720), the following steps and determinations may be carried out according to embodiments of the present invention. For John Doe to be authenticated requires each of the following determinations to be made in the affirmative. The steps are shown in FIG. 7 by the numbered arrows. At the outset, it is determined whether John Doe's public key 704 validates John Doe's digital signature 724, as shown by arrow 1. Next, it may be determined whether the current date is within the validity period 708 of the certificate, as shown at arrow 2. Thereafter, it may be determine whether the CA designated by the issuer's distinguished name 714 is a trusted CA, as shown by the arrow labeled 3. For example, if the CA designated by the issuer's distinguished name 714 is not present within a list maintained by the recipient of the certificate 702 (such as a FSP receiving a payment request, for example), the certificate (even if valid) will be refused and the underlying payment request or other request for access to programs or data one the FSP server will be denied. Then, it may be determined whether the issuing CA's public key 760 validates the issuing CA's digital signature 762, as shown by arrow 4. Finally, it may be determined whether John Doe's certificate 702 is listed in a data structure maintained by directory server 732. The directory server may store a list of all certificates (such as certificate 702) that the FSP (or other recipient of the certificate and XML message based requests) is configured to accept.

The authentication detailed above may be carried out over a secure communication channel between the client (the sender-employee of the digital certificate 702, the originator of the request) and the server (i.e., the server at the FSP or other trusted party). Secure Socket Layer (SSL) is a widespread, accepted and reliable algorithm for securing a communication channel between two parties. To establish an SSL session, two parties use public key encryption to agree on and share a common key. After the common key has been shared using asymmetric encryption, so that only the two parties have this information, bulk encryption may be used. The common key is shared only for a single connection and only during the connection. SSL, therefore, provides transient client authentication for the duration of an SSL connection. However, SSL does not provide persistent authentication for transactions that may occur during that connection. One way to provide such authentication is to associate a digital signature with data generated as the result of a transaction, such as a purchase order, payment instruction, or other financial documents or agreements according to embodiments of the present invention. This allows a company's financial application(s) the ability to provide persistent proof that someone has authorized a transaction and/or was authorized to access certain data and/or programs. It should be noted that SSL is only one example of a method for securing a communication channel. Those of skill in this art will readily recognize that other mechanisms may be implemented to establish a Virtual Private Network (VPN) between the user and the FSP such as, for example, SSH or other high strength cryptographic means such as quantum cryptographic techniques, for example.

Certificates complying with the X.509 standard include an extension 712 provided for user data. The X.509 standard does not mandate any particular use for the extension 712, which may consequently be used for most any purpose. Embodiments of the present invention utilize this user extension in X.509-compatible certificates to store information relating to the authority of the certificate holder. That is, in addition to certificate-identifying information and user-identifying information, the certificate 702 may also include information that defines the user's (typically, an employee of a company deploying an application configured to generate and send XML message based requests to an FSP or other trusted party) access to programs and/or data and/or other privileges (collectively referred to herein as authority).

According to an embodiment of the present invention, the authority of the certificate holder may be stored within the X.509 certificate's extension area as LDAP data expressed in DSML. The FSP may independently store a list of the user's ID, encrypted password, certificates and/or other relevant information in data structures stored within a server (such as shown at 732) for storing such data structures managed by Directory software. According to an embodiment of the present invention, the server 732 may also store an indication of the authority of each employee or person with whom the FSP might transact business. Specifically, within the context of a company, the server 732 may store the authority of each employee that is allowed or might be expected to request that the FSP carry out some transaction or who may desire access to data, applications and/or programs controlled by the FSP. For example, the FSP may store a monetary limit (a maximum dollar amount, for example) on transactions that may be authorized or requested by an employee of the company.

Directory software typically includes a repository (e.g., a list or database, for example) of names, permissions, resources, hardware, software and hierarchical information and/or rules within a network. Herein, the phrase "Directory software" encompasses any software including or managing such a repository that is designed to operate on computers coupled to a network. For example, the FSP may store the above-listed information in Directory software compatible with and accessible through Directory access software, such as Directory access software compatible with the X.500 Directory Access Protocol (DAP), which protocol is incorporated herein by reference, or a subset, extension or variant thereof. One such subset of DAP is the Lightweight Directory Access Protocol or LDAP or equivalent database storage of authenticating and detailed information about a registered user. For example, the FSP may implement Oracle Internet Directory™ (OID™) software (or upgrades/variants thereof), a software product developed by the assignee of the present invention. OID™ combines a native implementation of the Internet Engineering Task Force's (IETF) LDAP v3 standard (also incorporated herewith in its entirety by reference) with, for example, an Oracle back-end data store. Alternatively, other Directory software may be used for this purpose, such as Novell Directory Services™ (NDS™) of Novell, Inc.

According to embodiments of the present invention, software resident on an FSP server may be used by managers of the deploying company to generate employee certificates that include a definition and delineation of the employee's authority. The authority defined in the certificates may also include information as to whether the certificate holder has the right to delegate all or a portion of the authority defined and granted by the certificate. Should the certificate be configured so as to allow delegation of all or a portion of the authority defined therein, the certificate holder may delegate to his or her authority to one or more persons within the company or organization. A certificate holder may not delegate more authority than is defined in his or her certificate. In this manner, an employee certificate holder may delegate all or some of his or her authority to other employees that report to the employee or to other selected employees. Managers may, therefore, delegate a portion of their authority to those that report to them. In this manner, the delegation of authority may follow and map onto the company's hierarchical management structure, with those employees in hierarchically higher positions within the company selectively having the ability to delegate all or a portion of the authority defined in their certificates to hierarchically lower ranking employees within the company.

Mapping the authority as defined within a certificate according to embodiment of the present invention onto the company's hierarchical management structure (or onto some other predefined organizational structure) has several benefits. At the outset, such mapping of delegation authority onto the company's hierarchical management structure provides an efficient framework for controlling the actions employees may take on behalf or in the name of the company. Indeed, the ability of the employee certificate holders to bind the company is then commensurate with the employee's position within the company. C-level executives, for example, should have comparatively greater access to data and programs than other employees of the corporation. For example, CFOs should have a greater authority to bind a company to execute large payments to third parties than comparatively lower-ranking employees. In this manner, when the FSP carries out actions as directed by an employee of the company that has been suitably authenticated and that has the authority to request such actions, repudiation by the company of such actions is much less likely. This access to data and programs and well as the ability to bind the company may be codified and defined within the DSML statements within the user extension provided within the X.509 compliant certificates.

The authority that is defined within the user extension of certificates according to embodiments of the present invention may define an employee's ability and authority to perform a wide variety of functions on behalf of and in the name of the company. For example, the authority defined within digital certificates according to embodiments of the present inventions may enable an employee certificate holder to purchase goods and/or services, to accept an order for goods, to trigger payment for goods and/or services through an FSP and the ability to receive payments, for example. Each of the functions may be subject to limits and categorization and these limits and categorizations may be defined and quantified within the present certificate and communicated to the company's FSP or other trusted third party charged with validating the identity and authority of the certificate holders. Moreover, a company may limit the authority as defined within the certificate assigned to an employee to read-only, write, erase and/or execute data, programs, documents and other objects, among other possibilities. Such defined authority in the certificates presented to the FSP during a transaction help the FSP to fully authenticate transaction signed by employee certificate holders. Otherwise, an individual requesting access to data or requesting the execution of a payment request (for example) may be know to the FSP as being an employee of the company, but the FSP would not know whether the scope of the authority of the certificate holder covers access to such data or covers the execution of such a request for payment. If the FSP can successfully and unequivocally authenticate the employee, determine the scope of the authenticated employee's authority and only performs actions within scope of the determined scope of authority of the authenticated employee, such actions will be effectively non-repudiable by the company, thereby limiting possible recourses of the company against the FSP in the event of an unauthorized transaction or access to data or programs.

According to embodiments of the present invention, management of certificates and the consequent management of the authority granted to employees for online transactions may be greatly facilitated, and may follow the management of the employees. In a fluid job market, or during periods in which the company is reducing its workforce, it is essential that the employee's ability to access critical documents and programs be terminated at the same time as his or her employment. If the employee's authentication and authority instruments were to be kept separate, there is the chance that the revocation of the authentication and/or authority means will lag the employee's termination date or vice-versa. However, by combining standards for authentication and authorization in a single digital certificate issued by either the company or the company's FSP, and by controlling delegation of authority through the definition of authority in the certificates, a single action on the part of the company or the company's FSP (e.g., cancellation or revocation of the employee's digital certificate) will cancel the terminated employee's ability to become authenticated by third parties as well as the former employee's authority defined within the revoked certificate. In addition, the act of revoking a certificate containing both authentication and authorization information may, according to an embodiment of the present invention, selectively operate to also revoke and/or render invalid any certificates held by any employees that previously reported to the terminated employee. In this manner, by analogizing the company's hierarchical management structure to a tree having branches and leaves, metaphorically pruning any branch of the tree by revoking any certificate will also selectively operate to remove any and all of the leaves attached to the pruned branch—that is, the certificates of those employees that derived their authority from the revoked certificate of the terminated employee.

According to an embodiment of the present invention, the certificates provided by the FSP to the company may be altered by corporate authorities to express delegated privileges (as defined by the authority information included within the certificates) through a chain beginning with the CEO or CFO (for example). Each lesser manager may thereafter delegate some or all of his or her privileges to one or more subordinates. This action, which generates the subordinate employee's certificate, may be performed on line with software running on an FSP server.

The following is an example of a transaction between a company and an FSP, according to an embodiment of the present invention. An authorized company employee may log onto, for example, an Accounts Payable (AP) application from an appropriate display. A (XML-based, for example) message may then be formulated, the message including at least the name and other contact information for the Payee (a supplier of the company). The AP application or other process may then pass this message programmatically to a queue specific to the FSP. The FSP's software on its own site may be linked programmatically to this queue and may be configured to pick up any messages thereon. The FSP software may then send the message back to an FSP back end, where it may be further processed. Thereafter, either an exception or an acknowledgment of the generated message may be sent back to the company. Before executing the payment request, according to an embodiment of the present invention, the FSP must check that the buyer (company employee) has authorized signature authority from his or her company (originating with and traceable to and derivative from the authority defined for the top officers of the company and the appropriate roles and privileges, as defined by the authority coded within the user extension section of the presented digital certificate. It is proposed that, using a certificate login procedure, the buyer will present to the FSP a digital certificate as described above, containing both a verifiable digital signature and verifiable authority information. The FSP may then return a message to the company's AP application through the pre-established secure communication channel to the effect that the FSP has successfully authenticated and validated the authority of the certificate holder. The FSP may then accept and execute the buyer's payment request. If either the authentication or the validation of the authority defined within the received certificate fails, the FSP should not perform the requested action or allow access to the sought after data and/or programs.

From the FSP's point of view, the FSP should be listed as a financial service provider on the company's financial application (e.g., AP application). For example, an FSP ID may be provided to the company's application for identification purposes. The FSP also should manage authentication requirements during the set up process and during routine operation of the system on a (for example) daily basis. The FSP may also act as a CA and issue digital certificates to the company for use in authentication, to support server to server security of messages and to provide the FSP with information relating to the scope of authority of the employee certificate holder. The FSP may preferably require presentation of a digital certificate as described herein (generated, for example, by software provided to the company by the FSP). The user (employee certificate holder) may then assume responsibility for any pending XML payment messages by affixing his or her digital signature and the FSP will authenticate the certificate and determine, from the DSML code defining the authority of the certificate holder in the certificate and/or otherwise from its records, the appropriate authorization of the user with respect to these payment messages.

According to embodiments of the present invention, from the company's point of view, the AP application may communicate with the Company's FSP securely through an SSL session and/or other secure communications channel. Job functions, roles, limits, and privileges of each user of the AP application (who should be an employee certificate holder) in the company shall be documented either directly to the FSP offline or online through the use of DSML inclusion in certificates originating from the FSP as a CA, as described herein. Users may log in the FSP by a user name and password combination. A more favored and secure approach requires the use and presentation of a digital certificate as described herein to be granted access to authorized FSP resources. The AP application may then exchange XML payment (or other) messages and acknowledgements with the FSP through the secure communications channel, protected by certificates and PKI encryption of the messages being passed. The FSP application software may provide the company AP application with a SSL (for example) link to an FSP site at which any pending XML payments may be individually and collectively examined. The FSP may then confidently take responsibility for executing the pending payment requests and/or other requested actions because it has been able to verify both the identity of the certificate holder and the scope of authority of the certificate holder. By only carrying transactions on behalf of authenticated certificate holders within the scope of the authority defined within the certificates presented, the FSP is able to execute the requested transactions without fearing later repudiation by the company, due to alleged fraud or mistake during the transaction.

While the foregoing detailed description has described preferred embodiments of the present invention, it is to be understood that the above description is illustrative only and not limiting of the disclosed invention. Thus, the present invention should be limited only by the claims as set forth below.

What is claimed is:

1. A method for ensuring non-repudiation of a payment request obtained from a first party to have a payment made to a second party, the method comprising:

receiving, at the one or more computer systems, a payment request from the first party identifying the second party as at least one payee together with a digital certificate having a first portion comprising information identifying the first party as having originated the payment request and a second portion comprising a first list of specific payees to which to first party is authorized to request payment and a first maximum payment amount that the first party can request;

performing, with one or more processors associated with the one or more computer systems, an authentication of the first party using the first portion of the digital certificate;

retrieving, with the one or more processors associated with the one or more computer systems, stored authority information from a store of authority information maintained by a financial services provider in response to performing the authentication of the first party using the first portion of the digital certificate, the authority information in the store of authority information including a second list of specific payees that have been registered with the financial services provider to whom the first party can request payment and a second maximum payment amount registered with the financial services provider that the first party can request;

validating, with the one or more processors associated with the one or more computer systems, whether the digital certificate comprises valid authority information based on a comparison between first list of specific payees and the first maximum payment amount presented in the digital certificate and the second list of specific payees and the second maximum payment amount in the authority information retrieved from the store of authority information maintained by the financial services provider; and generating, with the one or more processors associated with the one or more computer systems, information authorizing the payment request in response to the first party being authenticated by the financial service provider and possessing valid authority to issue the payment request to the second party.

2. The method of claim 1, wherein generating the information authorizing the payment request comprises authorizing the payment request when the maximum payment amount is recognized by the financial service provide as valid and at least greater than or equal to a predetermined amount associated with the payment request.

3. The method of claim 1, wherein the received digital certificate conforms to the X.509 standard.

4. The method of claim 1, wherein the second portion within the received digital certificate is configured as XML code.

5. The method of claim 1, wherein the XML code is compliant with a DSML standard.

6. A non-transitory computer-readable medium storing code for ensuring non-repudiation of a payment request obtained from a first party to have a payment made to a second party that when executed by a processor of a computer system causes the processor to perform the steps comprising:

receiving a payment request from the first party identifying the second party as at least one payee together with a digital certificate having a first portion comprising information identifying the first party as having originated the payment request and a second portion comprising a first list of specific payees to which to first party is authorized to request payment and a first maximum payment amount that the first party can request;

performing an authentication of the first party using the first portion of the digital certificate;

retrieving stored authority information from a store of authority information maintained by a financial services provider in response to performing the authentication of the first party using the first portion of the digital certificate, the authority information in the store of authority information including a second list of specific payees that have been registered with the financial services provider to whom the first party can request payment and a second maximum payment amount registered with the financial services provider that the first party can request;

validating whether the digital certificate comprises valid authority information based on a comparison between first list of specific payees and the first maximum payment amount presented in the digital certificate and the second list of specific payees and the second maximum payment amount in the authority information retrieved from the store of authority information maintained by the financial services provider; and generating information authorizing the payment request in response to the first party being authenticated by the financial service provider and possessing valid authority to issue the payment request to the second party.

7. The non-transitory computer-readable medium of claim 6, wherein generating the information authorizing the payment request comprises authorizing the payment request when the maximum payment amount is recognized by the financial service provide as valid and at least greater than or equal to a predetermined amount associated with the payment request.

8. The non-transitory computer-readable medium of claim 6, wherein the received digital certificate conforms to the X.509 standard.

9. The non-transitory computer-readable medium of claim 6, wherein the second portion within the received digital certificate is configured as XML code.

10. The non-transitory computer-readable medium of claim 6, wherein the XML code is compliant with a DSML standard.

11. A system for ensuring non-repudiation of a payment request obtained from a first party to have a payment made to a second party, the system comprising:

a processor; and a memory, in communication with the processor, and storing a set of computer-executable instructions that when executed by the processor cause the processor to perform the steps comprising:

receiving a payment request from the first party identifying the second party as at least one payee together with a digital certificate having a first portion comprising information identifying the first party as having originated the payment request and a second portion comprising a first list of specific payees to which to first party is authorized to request payment and a first maximum payment amount that the first party can request;

performing an authentication of the first party using the first portion of the digital certificate;

retrieving stored authority information from a store of authority information maintained by a financial services provider in response to performing the authentication of the first party using the first portion of the digital certificate, the authority information in the store of authority information including a second list of specific payees that have been registered with the financial services provider to whom the first party can request payment and a second maximum payment amount registered with the financial services provider that the first party can request;

validating whether the digital certificate comprises valid authority information based on a comparison between first list of specific payees and the first maximum payment amount presented in the digital certificate and the second list of specific payees and the second maximum payment amount in the authority information retrieved from the store of authority information maintained by the financial services provider; and generating information authorizing the payment request in response to the first party being authenticated by the financial service provider and possessing valid authority to issue the payment request to the second party.

12. The system of claim 11, wherein to generate the information authorizing the payment request the processor is further caused to authorize the payment request when the maximum payment amount is recognized by the financial service provide as valid and at least greater than or equal to a predetermined amount associated with the payment request.

13. The system of claim 11, wherein the received digital certificate conforms to the X.509 standard.

14. The system of claim 11, wherein the second portion within the received digital certificate is configured as XML code.

15. The system of claim 11, wherein the XML code is compliant with a DSML standard.

* * * * *

UNITED STATES PATENT AND TRADEMARK OFFICE
CERTIFICATE OF CORRECTION

| | | |
|---|---|---|
| PATENT NO. | : 8,566,249 B2 | Page 1 of 1 |
| APPLICATION NO. | : 10/727409 | |
| DATED | : October 22, 2013 | |
| INVENTOR(S) | : Johnson | |

It is certified that error appears in the above-identified patent and that said Letters Patent is hereby corrected as shown below:

On title page 2, column 1, References Cited under "other publications", line 8, delete "Nerw" and insert -- New --, therefor.

In the Specification

In column 8, line 19, delete "the a" and insert -- the --, therefor.

In column 18, line 47, delete "know" and insert -- known --, therefor.

Signed and Sealed this
Eighth Day of September, 2015

Michelle K. Lee
*Director of the United States Patent and Trademark Office*